United States Patent [19]

Okada et al.

[11] Patent Number: 5,254,836
[45] Date of Patent: * Oct. 19, 1993

[54] METHOD OF ARC WELDING WITH A FERRITE STAINLESS STEEL WELDING ROD

[75] Inventors: Yuuji Okada, Nagoya; Toshihiko Kobayashi, Okazaki; Hiroshi Sasabe; Yoshimitsu Aoki, both of Itami; Makoto Nishizawa, Nagoya; Shunji Endo, Ibaragi, all of Japan

[73] Assignees: Toyota Jidosha Kabushiki Kaisha; Sumitomo Electric Indus., Ltd.; Nippon Stainless Steel Co., all of Japan

[ * ] Notice: The portion of the term of this patent subsequent to Apr. 19, 2009 has been disclaimed.

[21] Appl. No.: 383,265

[22] Filed: Jul. 20, 1989

Related U.S. Application Data

[63] Continuation of Ser. No. 186,463, Apr. 26, 1988, abandoned.

[30] Foreign Application Priority Data

Apr. 27, 1987 [JP] Japan .................................. 62-103780

[51] Int. Cl.$^5$ ........................ C22C 38/20; C22C 38/42
[52] U.S. Cl. ............................ 219/146.23; 219/146.1; 420/60; 420/70
[58] Field of Search .............. 420/60, 70; 219/146.23, 219/146.1

[56] References Cited

U.S. PATENT DOCUMENTS 4,360,381 11/1982 Tarutani et al. ...................... 420/66

FOREIGN PATENT DOCUMENTS 58-64354  4/1983  Japan .................................. 420/60
58-202993 11/1983  Japan .
2085187  4/1980  United Kingdom .................. 420/60

Primary Examiner—Deborah Yee
Attorney, Agent, or Firm—Kenyon & Kenyon

[57] ABSTRACT

The ferrite stainless steel welding rod of this invention comprises the following: 0.03% by weight or less of carbon, 1.00% by weight or less of silicon, 1.00% by weight or less of manganese, from 16.0 to 21.0% by weight of chromium, from 0.30 to 0.80% by weight of niobium, from 0.30 to 0.80% by weight of copper, 0.025% by weight or less of nitrogen, and the balance of iron. The ferrite stainless steel welding rod of this invention offers a good weldability not only in welding stainless steels of the same type but also in welding stainless steels of different types. Further, the welding steel of this invention has a good oxidation resistance, and a good workability and mechanical property.

8 Claims, 7 Drawing Sheets (×100)

(×100)

(×100)

(×100)

(×100)

(×100)

METHOD OF ARC WELDING WITH A FERRITE STAINLESS STEEL WELDING ROD

This application is a continuation of application Ser. No. 07/186,463, filed 26 Apr. 1988, now abandoned.

BACKGROUND OF THE INVENTION

1. Field of the Invention

This invention relates to a ferrite welding rod for welding stainless steels.

2. Description of the Prior Art

Many austenite welding rods for welding stainless steels have been proposed. However, only welding rods Y410 and Y430 according to Japanese Industrial Standards, i.e., JIS Z3321, are available as standard ferrite welding rods.

Welding rod Y410 has the following composition (Hereinafter the percentage referred in this specification shall mean the weight percentage unless otherwise specified.): 0.12% or less of carbon, 0.50% or less of silicon, 0.60% or less of manganese, 0.03% or less of phosphorus, 0.03% or less of sulfur, 0.60% or less of nickel, from 11.5 to 13.5% of chromium, 0.60% or less of molybdenum, and the balance of iron.

And welding rod Y430 has the following composition: 0.10% or less of carbon, 0.50% or less of silicon, 0.60% or less of manganese, 0.03% or less of phosphorus, 0.03% or less of sulfur, 0.60% or less of nickel, form 15.5 to 17.0% of chromium, and the balance of iron.

Also, welding rod YT434NB produced by Nittetsu Yousetsu Kogyo Co., Ltd. has been known as a commercially available ferrite welding rod. Welding rod YT434NB has the following composition: 0.07% of carbon, 0.35% of silicon, 0.64% of manganese, 17.7% of chromium, 0.90% of molybdenum, 0.91% of niobium, and the balance of iron.

And especially, when welding metals of different types, for instance, when welding a ferrite stainless steel and an austenite stainless steel, welding rod Y309 according to Japanese Industrial Standards, i.e., JIS Z3321, has been used quite often. Welding rod Y309 has the following composition: 0.12% or less of carbon, 0.60% or less of silicon, from 1.00% to 2.50% of manganese, 0.03% or less of phosphorus, 0.03% or less of sulfur, from 12.0 to 14.0% of nickel, from 23.0 to 25.0% of chromium, and the balance of iron.

Weldments using the conventional welding rod, such as welding rods Y410 and Y430, used for welding ferrite stainless steels are very brittle, since carbon, oxygen and the like in a shielding gas cause the martensite precipitation when welding. There has been proposed an engineering approach, like the above mentioned welding rod YT434NB, in which niobium or titanium is added to welding rod Y430 to delay the delayed fracture, and the crystal grains are made smaller by the effect of titanium to avoid the cracking and fracture. However, the engineering approach has not produced a satisfactory result yet. In addition, weldments using these conventional welding rods exhibit the hydrogen embrittlement and reduced impact resistance when they have not undergone the heat treatment before and after welding.

The welding rod Y309 used for welding stainless steels of different types cannot be applied to a component which is subjected to a thermal cycle composed of heating and cooling processes. The deformation and cracking of the component occur, since the bulging i.e., the weld bead bulges outwardly due to the thermal cycle when an austenite stainless steel with a high thermal expansion coefficient is lapped and welded on a ferrite stainless steel with a low thermal expansion coefficient, is caused by the thermal stress or the thermal fatigue resulting from the difference in the thermal expansion coefficients. When welding rod Y410 or Y430 is used to weld the stainless steels of different types, carbon and nickel are dissolved into the weld bead from the austenite stainless steel. Thus, the impact resistance of the lap joint is reduced, since the structure in the weld bead is transformed into martensite. Further, the delayed fracture or the hydrogen embrittlement occurs when hydrogen and oxygen intrude into such martensitized weld bead.

SUMMARY OF THE INVENTION

This invention solves the above mentioned problems. Accordingly, it is an object of this invention to provide a ferrite welding material offering a good performance in welding stainless steels of different types and having good oxidation resistance, and a good workability and processability.

The welding material of this invention comprises the following:

0.03% or less of carbon, 1.00% or less of silicon, 1.00% or less of manganese, from 16.0 to 21.0% of chromium, from 0.30 to 0.80% of niobium, from 0.30 to 0.80% of copper, 0.025% or less of nitrogen, and the balance of iron. 5.0% or less of nickel may be contained in the above mentioned composition.

When the ferrite welding material of this invention is used to weld the stainless steels of different types, i.e. welding the ferrite stainless steel and the austenite stainless steel, the bulging and the hydrogen embrittlement due to the thermal stress are less likely to occur. And the ferrite welding material of this invention has a good advantage of getting rid of the heat treatment before and after the welding.

The ferrite welding material of this invention features that it contains less carbon and more chromium than the conventional ferrite welding rod like Y410 and Y430, and that it contains niobium and copper as well.

The content of carbon is kept 0.03% or less in this invention to ferritize the structure. The lower limit of the carbon content is approximately 0.01%.

The content of silicon is kept 1.00% or less in this invention. The toughness and the ductility of the weld metal is reduced greatly when the silicon content exceeds 1.00%. The lower limit of the silicon content is approximately 0.5%.

The content of manganese is kept 1.00% or less in this invention. The hardness of the welding material is increased and the forming processability is deteriorated when the manganese content exceeds 1.00%. The lower limit of the manganese content is 0.4%.

The content of chromium is kept as high as from 16.0 to 21.0% to prevent the deterioration of the strength and the impact resistance by increasing the chromium amount in the solid solution state. It produces a combined effect with the reduced carbon content, and prevents the deterioration of the strength and the impact resistance. Also chromium is a necessary element to improve the oxidation resistance. The upper limit of the chromium content is kept at 21.0% because the toughness of the weld steel decreases when it exceeds 21.0%. The lower limit is kept at 16.0% lest the corrosion resistance of the weld steel deteriorates further than the corrosion resistance of the base steel does.

Niobium is contained in this invention to improve the oxidation resistance and strengthen the grain boundaries. It does not show any effect when the niobium content is 0.3% or less. It shows the best effect when the niobium content is approximately 0.5%. However, when the niobium content exceeds 0.8%, the welding material is inclined to break and its productivity tends to decrease when the welding material is subjected to a wire drawing accompanying a higher rate of area reduction. Therefore, the upper limit of the niobium content is kept at 0.8%.

Copper is contained in this invention to improve the welding workability. The flowability of the molten metal of the welding material is bad during welding because the carbon and nickel contents are kept low in this invention, but it is improved by adding a small amount of copper. It is not effective to improve the welding workability satisfactorily when the copper addition amount is less than 0.3%. The ductility and the toughness decrease when the copper addition amount exceeds 0.8%. This results from the precipitation of copper compounds and the hardening thereof due to the thermal influence of welding.

When welding the stainless steels of different types, i.e., welding the combination of an austenite stainless steel and a ferrite stainless steel, nickel is dissolved into the weld bead from the austenite stainless steel. Therefore, there is a possibility to deteriorate the impact resistance because the structure of the weld bead is transformed into martensite. However, it is preferable to add nickel by 5% or less, since the processability increases when the weld bead contains an appropriate amount of nickel. It is especially preferable to involve nickel by approximately 3%. Thus, it is possible to control the nickel content of the weld bead within the range mentioned above by using the welding material containing less than 5% of nickel.

The carbon content is kept as extremely low as 0.03% or less in this invention. Thus, the hydrogen storage is less, and no hydrogen embrittlement occurs when an ordinary shielding gas is used.

And no heat treatment, such as tempering and the like, is required before and after welding, since no martensite is generated in the weld bead. As a result when it is compared with the conventional ferrite welding rod, the workability is improved greatly, since no heat treatment is required before and after welding.

A conventional shielding gas, varied from 100% argon gas to argon plus 20% of carbon dioxide gas, may be used as a shielding gas for the welding material of this invention without any problem. It is preferred to use argon plus 2% of oxygen gas to obtain an especially good workability. In addition, a flux may be used.

When welding with the welding material of this invention, current and voltage can be set within the service conditions of Tungsten Inert Gas (TIG) or Metal Inert Gas (MIG) arc welder which is usually employed. In other words, the welding operation can be done under the service conditions of TIG or MIG arc welder.

As explained above, the ferrite welding rod of this invention contains less amount of carbon and nickel, and relatively greater amount of chromium than the conventional welding rod. In addition, the ferrite welding material of this invention contains niobium and copper. Therefore, it offers a good weldability regardless of types of stainless steels to be welded. In other words, the welding material of this invention offers a good weldability not only in welding stainless steels of the same type but also in welding stainless steels of different types. Further, the welding rod of this invention has a good oxidation resistance, and a good workability and processability.

DETAILED DESCRIPTION OF THE DRAWINGS

DETAILED DESCRIPTION OF THE PREFERRED EMBODIMENTS

Six welding rods No. 1 through No. 6 were produced out of 6 compositions shown in Table 1 by appropriate heat treatments and wire drawing. Compositions labeled No. 1 through No. 3 are those for producing the welding rods No. 1 through No. 3 of this invention. The other compositions labeled No. 4 to No. 6 are those for producing the welding rods No. 4 through No. 6 of comparative examples.

TABLE 1

| | | Chemical Element Composition (wt. %) | | | | | | | |
|---|---|---|---|---|---|---|---|---|---|
| | | C | Si | Mn | Cr | Nb | Cu | N | Fe |
| Present Invention | No.1 | 0.01 | 0.75 | 0.60 | 20.5 | 0.75 | 0.78 | 0.013 | Balance |
| | No.2 | 0.02 | 0.80 | 0.74 | 20.9 | 0.68 | 0.70 | 0.020 | Balance |

TABLE 1-continued

| | | Chemical Element Composition (wt. %) | | | | | | |
|---|---|---|---|---|---|---|---|---|
| | | C | Si | Mn | Cr | Nb | Cu | N | Fe |
| | No.3 | 0.02 | 0.67 | 0.77 | 20.4 | 0.32 | 0.72 | 0.021 | Balance |
| Comparative Example | No.4 | 0.01 | 0.82 | 0.48 | 18.7 | 0.32 | 0.12 | 0.032 | Balance |
| | No.5 | 0.02 | 0.70 | 0.56 | 19.2 | 0.14 | 0.11 | 0.031 | Balance |
| | No.6 | 0.04 | 0.79 | 0.74 | 18.1 | 0.18 | 0.24 | 0.051 | Balance |

Figure 1:
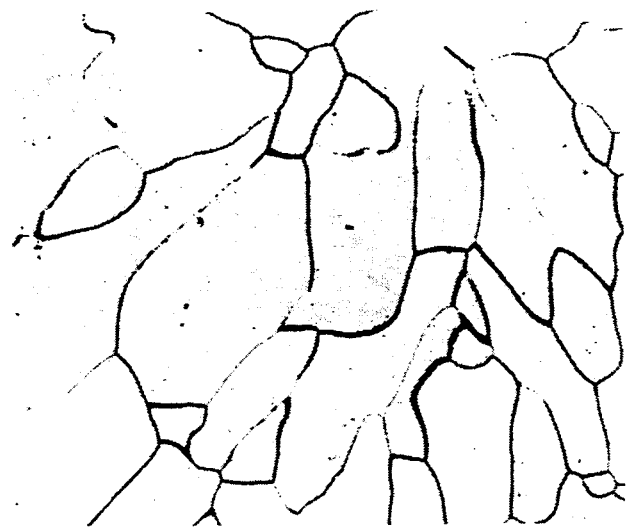
FIG. 1 is a photograph illustrating the metal structure of the weld bead obtained by using welding rod No. 1 as per this invention.

Welding was performed by a MIG arc welder with thus obtained six welding rods No. 1 through No. 6 under the following conditions:
Current: 120 A
Voltage 18 V
Shielding gas: Argon plus 2% of oxygen Metal structures of weld beads obtained by the welding are shown in photographs of FIGS. 1 through 6. The structure of FIG. 1 is of the weld bead obtained by using welding rod No. 1. The structures of FIGS. 2, 3, 4, 5 and 6 are of the weld beads obtained by using welding rods Nos. 2, 3, 4, 5 and 6 respectively.

Figure 2:
FIG. 2 is a photograph illustrating the metal structure of the weld bead obtained by using welding rod No. 2 as per this invention.
Figure 3:
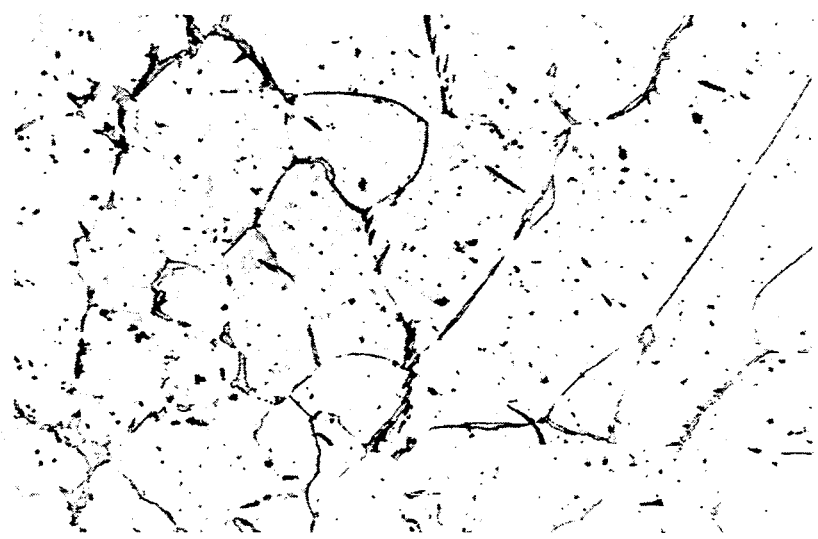
FIG. 3 is a photograph illustrating the metal structure of the weld bead obtained by using welding rod No. 3 as per this invention.

It is understood from the metal structures shown in FIG. 1 through FIG. 3 that the structures in the weld beads were all transformed into ferrite when the welding rods No. 1 through No. 3, i.e., the welding rods of this invention, were used.

Figure 4:
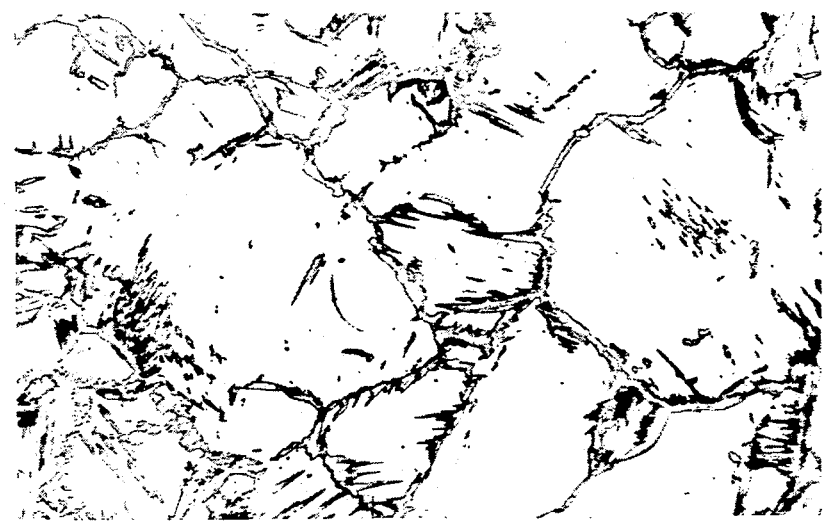
FIG. 4 is a photograph illustrating the metal structure of the weld bead obtained by using welding rod No. 4 as per a comparative example.
Figure 5:
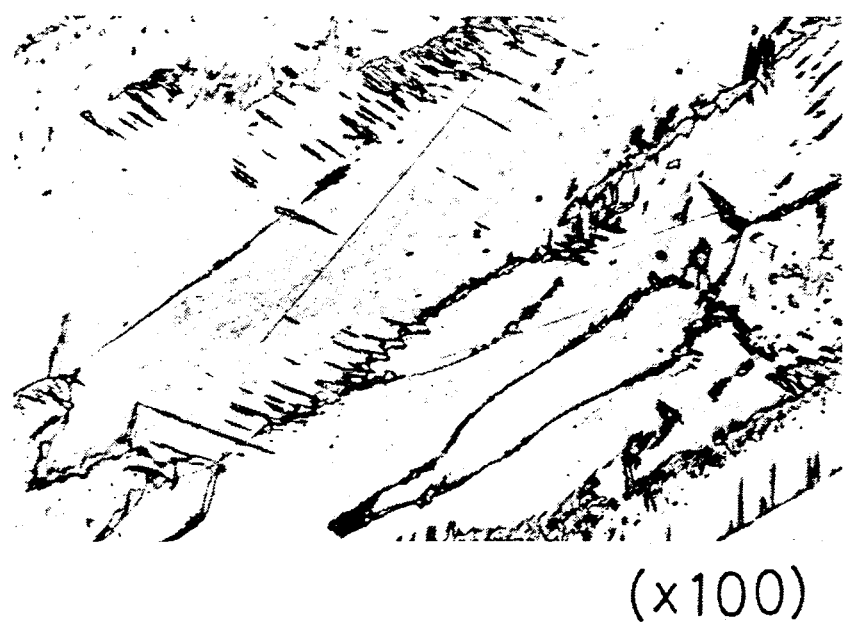
FIG. 5 is a photograph illustrating the metal structure of the weld bead obtained by using welding rod No. 5 as per a comparative example.
Figure 6:
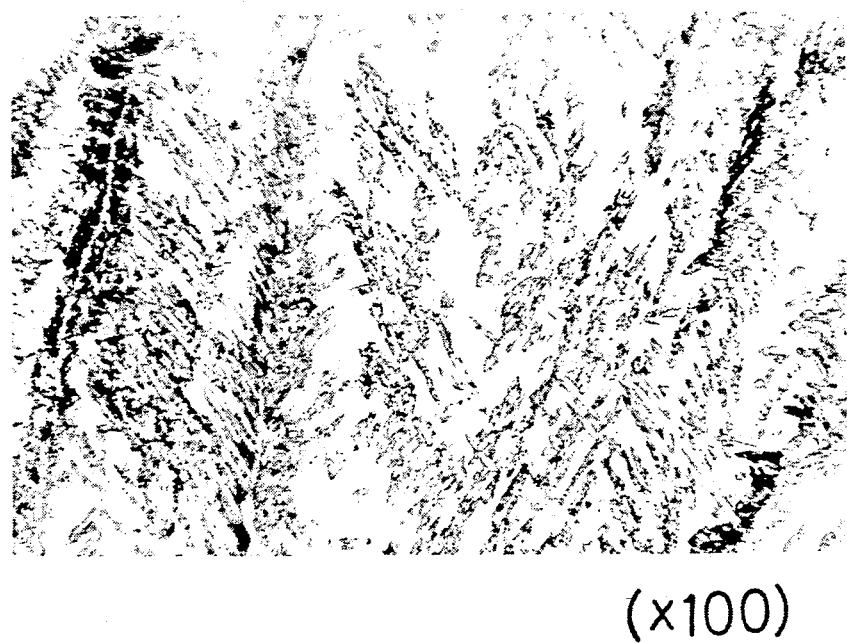
FIG. 6 is a photograph illustrating the metal structure of the weld bead obtained by using welding rod No. 6 as per a comparative example.

On the other hand, as can be clearly seen from FIG. 4 through FIG. 6, martensite having a black acicular or needlelike pattern was generated in the weld bead structures when the welding rods No. 4 through No. 6, i.e., the welding rods of comparative examples, were used.

Next, the following delayed fracture test was conducted to evaluate the weldments obtained with the welding rod of this invention, and with the conventional standard welding rods Y430 and Y308.

Figure 7:
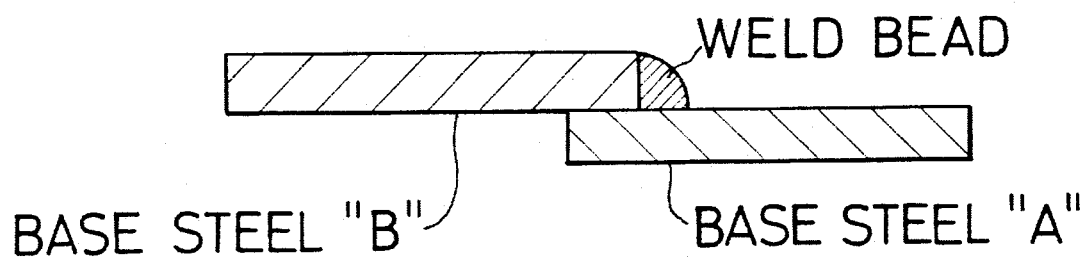
FIG. 7 is a schematic illustration on how a lap-welding was performed.
Figure 8:
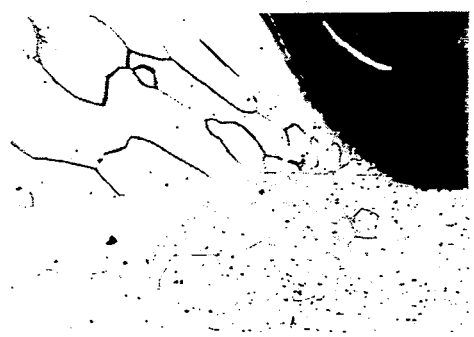
FIG. 8 is a photograph illustrating the metal structure of the weld bead of the lap-welding obtained by using welding rod No. 2 as per this invention.
Figure 9:
FIG. 9 is a photograph illustrating the metal structure of the weld bead of the lap-welding obtained by using a conventional standard welding rod Y430.
Figure 10:
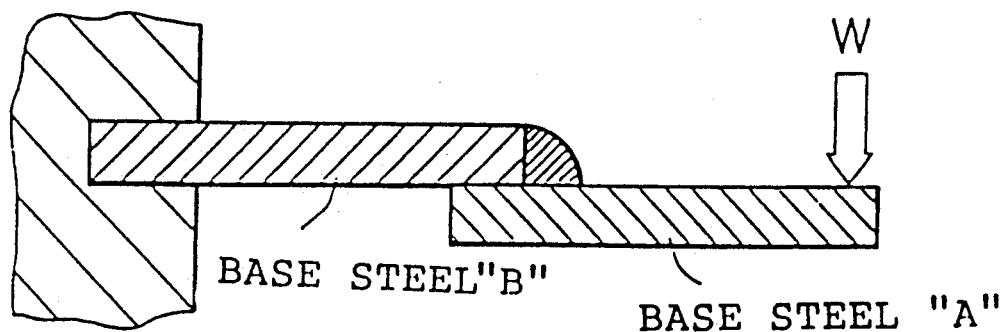
FIG. 10 is a schematic illustration on how a delayed fracture test was performed.

As shown in FIG. 7, base steels "A" and "B" were lapped. Here, SUS430 as per Japanese Industrial Standards was used as the base steel "A", and SUSXM15J1 as per Japanese Industrial Standards was used as the base steel "B". And then, lap-welding between the stainless steels of different types was performed with the above mentioned welding rod No. 2 (as per this invention), and the conventional standard welding rods Y430 and Y308. The size of the plate was 100 mm × 50 mm × 1.5 mm for both base steels "A" and "B". The base steels "A" and "B" were lapped by about 10 mm. The welding was performed under the following conditions:
Current: 120 A
Voltage: 19 V
Shielding gas: Argon plus 2% of oxygen gas The metal structure in the weld bead obtained by using welding rod No. 2 (as per this invention) is shown in the photograph of FIG. 8. And the metal structure in the weld bead obtained by using the conventional standard welding rod Y430 is shown in the photograph of FIG. 9. It is understood from FIG. 8 that the structure obtained by using the welding rod No. 2 (as per this invention) was all transformed into ferrite. And it is understood from FIG. 9 that the structure obtained by using the conventional standard welding rod Y430 was transformed into martensite.

Then, the delayed fracture test was performed on the test pieces (or weldments). A load "W" of 1 kgf was applied continually to the end of the base steel "A" while holding the end of the base steel "B".

As a result, in the case of welding rod Y430, fine crackings were generated in the weld bead 8 days after the test was started. However, in the cases of this invention and welding rod Y308, no generation of cracking occurred in the weld beads even 30 days after the test was started.

Next, another seven welding rods were produced out of 7 compositions shown in Table 2. Composition labeled No. 11 is for producing the welding rod No. 11 of this invention. Compositions labeled No. 12 through No. 17 are those for producing the welding rods of comparative examples No. 12 through No. 17. The comparative examples No. 12 and No. 16 has a higher carbon content than that of the welding rod of this invention. The comparative example No. 13 has a higher niobium content than that of the welding rod of this invention. The comparative example No. 14 has a lower niobium content than that of the welding rod of this invention. The comparative example No. 15 has a lower chromium content than that of the welding rod of this invention. And the comparative example No. 17 has a higher silicon content than that of the welding rod of this invention.

TABLE 2

| | | Chemical Element Composition (wt. %) | | | | | | |
|---|---|---|---|---|---|---|---|---|
| | | C | Si | Mn | Cr | Nb | Cu | Fe |
| Present Invention | No. 11 | 0.01 | 0.45 | 0.58 | 18.5 | 0.54 | 0.52 | Balance |
| Comparative Example | No. 12 | 0.08 | 0.45 | 0.72 | 17.4 | 0.44 | 0.63 | Balance |
| | No. 13 | 0.02 | 0.63 | 0.49 | 19.2 | 0.95 | 0.34 | Balance |
| | No. 14 | 0.01 | 0.38 | 0.41 | 18.7 | 0.22 | 0.19 | Balance |
| | No. 15 | 0.01 | 0.49 | 0.86 | 15.2 | 0.41 | 0.47 | Balance |
| | No. 16 | 0.14 | 0.63 | 0.79 | 18.7 | 0.56 | 0.55 | Balance |
| | No. 17 | 0.01 | 1.62 | 0.78 | 20.3 | 0.56 | 0.52 | Balance |

Then, the following tests were conducted on these 7 welding rods, and on the conventional standard welding rods Y430 and Y308 to evaluate them.

(1) Thermal Cycle Test

Figure 11:
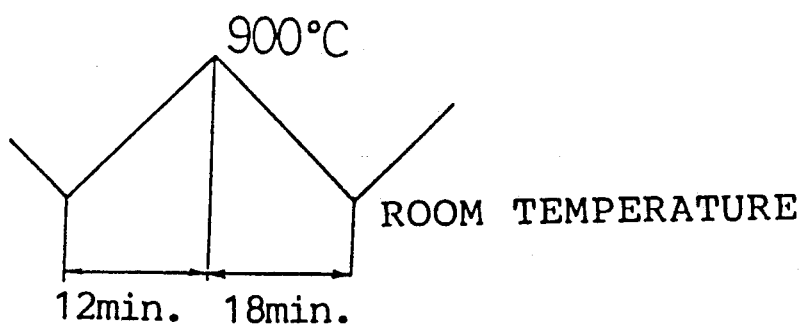
FIG. 11 is a test pattern diagram of a thermal cycle test.
Figure 12:
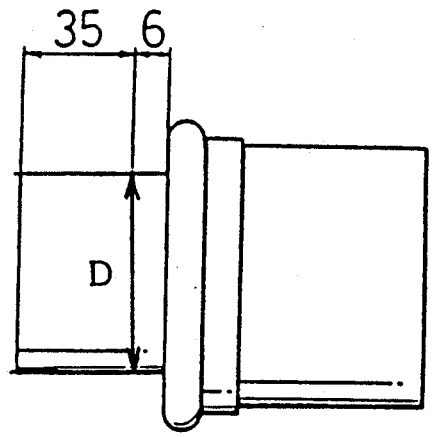
FIG. 12 is a schematic illustration of a pipe which was manufactured for the thermal cycle test, and on how the pipe deformation was measured.

A pipe made of SUS430 and having an external diameter of 38.1 mm and a pipe made of SUS430 and having an external diameter of 42.7 mm were joined as shown in FIG. 12 by welding with welding rod No. 11 as per this invention, welding rods No. 12 through No. 17 as those of the comparative examples and welding rod Y430 as the conventional standard welding rod under the following conditions:
Current: 140 A
Voltage: 19 V
Shielding gas: Argon plus 2% of oxygen And the pipe was also made by using welding rod Y308 as the conventional standard welding rod under the following conditions:
Current: 160 A
Voltage: 18 V
Shielding gas: Argon plus 2% of oxygen All the weldings were performed at the welding speed of 300 mm/min., the torch angle of 90 deg., and the torch height of 10 mm. Then, the pipes thus obtained were subjected to the thermal cycle test whose test pattern is illustrated in FIG. 11, i.e., a repeated oxidation test was performed in which one cycle consists of a heating process from room temperature to 900°

C. in 12 minutes and a cooling process from 900° C. to room temperature in 18 minutes.

Figure 13:
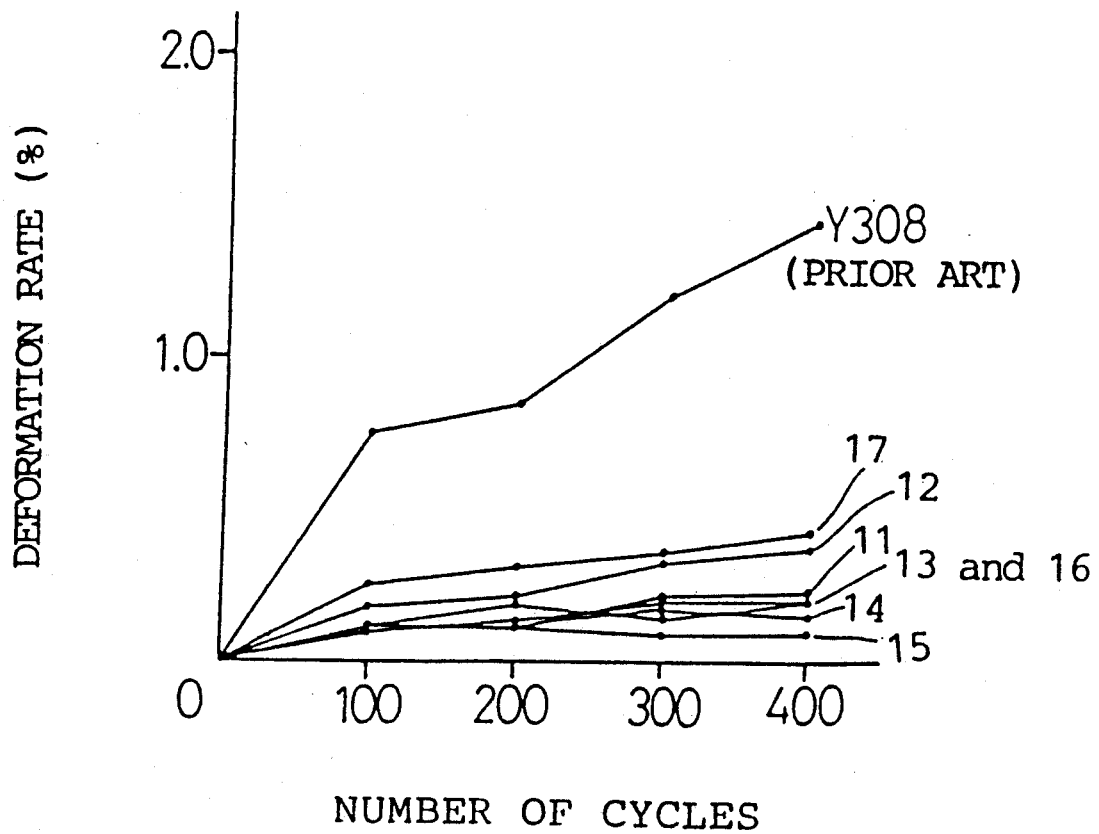
FIG. 13 is a graph showing relationships between the number of cycles and the deformation rate in the thermal cycle test.

The measurement on the pipe deformation was done by measuring the external diameter "D" of the joined portion of the pipes by an interval of 45 deg., and by finding the average value of the internal diameters. A graph in FIG. 13 illustrates how the deformation ratio increases as the number of cycles increases for each of the welding rods, i.e., No. 11 as the welding rod of this invention, No. 12 through No. 17 as the welding rods of the comparative examples, and Y308 as the conventional standard welding rod.

When welding rod Y308 was used, the pipe deformed remarkably. The deformation rate was 1.4% at the completion of 400 cycles. On the other hand, when welding rods No. 11 through No. 17 were used, the pipe deformation rates were increased in extremely less degrees. For instance, especially when welding rod No. 11 (as per this invention) was used, only about 0.3% of deformation was found in the pipe at the completion of 400 cycles.

As a result of the thermal cycle test, it was found that scale due to oxidation was generated in the weld bead at 86 cycles' completion when welding rod Y430 was used. While, no scale due to oxidation was found at 400 cycles' completion when welding rod No. 11 (as per this invention) and welding rod Y308 were used. Although, as mentioned earlier, no remarkable deformation was found at the completion of 400 cycles when welding rod No. 11 (as per this invention) was used, when welding rod Y308 was used, visually appreciable deformation had been found since 127 cycles were completed.

Figure 14:
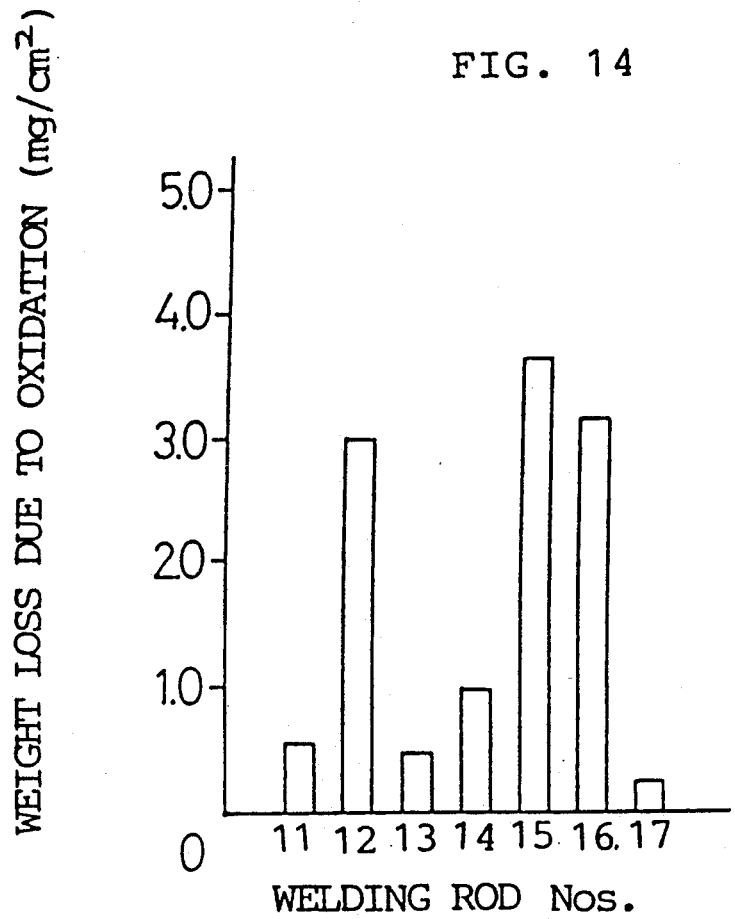
FIG. 14 is a graph showing weight losses per unit area due to oxidation of welding rods in a continuous oxidation test.

Next, a continuous oxidation test, i.e., heating at 900° C. for 100 hours, was performed on the welding rods having the compositions shown in Table 2. The results are shown in a graph of FIG. 14. As can be seen from the graph, the welding rods having composition No. 12 (a high carbon content), composition No. 15 (a low chromium content), and composition No. 16 (a high carbon content) lost their weight per unit area ($cm^2$) remarkably. But the welding rods having high niobium-chromium contents, i.e., composition No. 11 (as per this invention) and compositions No. 13 and No. 17 were found to have good oxidation resistance, and that the welding rod having composition No. 11 (as per this invention) was found that it lost the least weight per ( unit area ($cm^2$) among them.

(2) Wire Drawing Test

After the welding rods No. 11 through No. 17 were heat-treated in a manner appropriate for each of the welding rods, wires were manufactured out of the heat-treated welding rods by cold continuous drawing in which the same facilities and dies were used for each of the welding rods. Then, the wire drawability was evaluated by checking whether the welding rods broke at the area reduction rate of 10000 m drawing.

When welding rods No. 12, No. 13, No. 16 and No. 17 were drawn, breakage had started at about 80% of area reduction rate. While, when welding rods No. 11 (as per this invention), No. 14 and No. 15 were drawn, no breakage was found at high area reduction rates. And no breakage was found even at 90% of area reduction rate.

(3) Wire Linear Movement Test

The wire linear movement test was performed on the welding rods having a wire diameter of 1.2 mm to evaluate how the welding rods deviated from the origin of the x-y coordinate system taken as a target point, and how much the deviations were. The nozzle height was 150 mm. Tested welding rods were welding rod No. 11 (as per this invention) and the conventional standard welding rods Y308 and Y430. When performing the test, the following were used as the testing machine:
Power source: Matsushita HF-350
Robot Matsushita AW550

Figure 15:
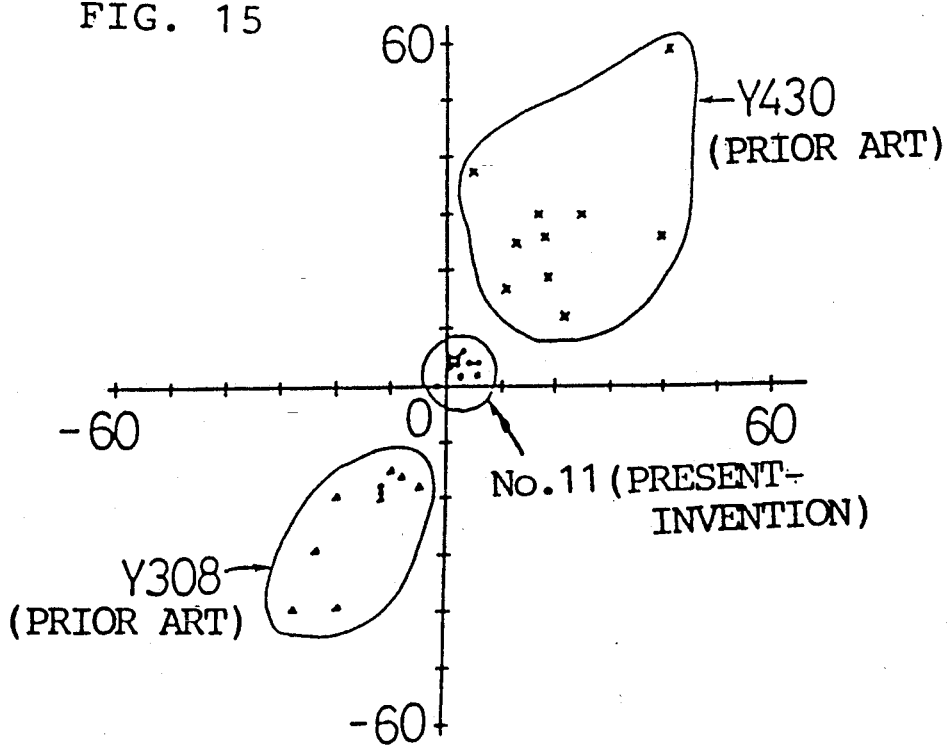
FIG. 15 is a scatter diagram showing the results of a wire linear movement test.

The results of the wire linear movement test are shown in a scatter diagram of FIG. 15. As can be seen from FIG. 15, it was found that welding rod No. 11 exhibited a good linear movement falling in the range of ±10 or less, and that welding rods Y308 showed a tendency deviating from the origin in the minus direction, and that the weld bead obtained by using welding rod Y430 had a worse linear movement because welding rod Y430 showed deviation from the origin in the plus direction and a great scattering. This results from fact that welding rod No. 11 (as per this invention) is a ferrite welding rod having a low carbon content. Since welding rod No. 11 is a ferrite welding rod having a low carbon content, it has a smaller yield point than those of welding rods Y308 and Y430 which are also ferrite welding rods but have high carbon contents. Thus, the straightness of welding rod No. 11 can be corrected easily, and a good linear movement can be offered by welding rod No. 11.

What is claimed is:

1. An arc welding process comprising the steps of:
preparing a welding material and
deposition a molten bead of said welding material on a workpiece, wherein said welding material consists essentially of:
0.03% by weight or less of carbon; 1.00% by weight or less of silicon; 1.00% by weight or less of manganese; from 16.0 to 21.0% by weight of chromium; from 0.30 to 0.80% by weight of niobium; from 0.30 to 0.80% by weight of copper; 0.025% by weight or less of nitrogen; and the balance of iron, and wherein the structure of the welding material is ferrite.

2. An arc welding process according to claim 1, wherein the carbon content of said welding material is in a range of from 0.01 to 0.03% by weight; the silicon content is in a range of from 0.50 to 1.00% by weight; and the manganese content is in a range from 0.40 to 1.00% by weight.

3. An arc welding process according to claim 1, wherein the step of preparing said welding material comprises forming the welding material into a rod.

4. An arc welding process according to claim 1, wherein the step of preparing said welding material comprises forming the welding material into a wire.

5. An arc welding process comprising the steps of:
preparing a welding material and
depositing a molten bead of said welding material on a workpiece, wherein said welding material consists essentially of:
0.03% by weight or less of carbon; 1.00% by weight or less of silicon; 1.00% by weight or less of manganese; form 16.0 to 21.0% by weight of chromium; 5.0% by weight or less of nickel; from 0.30 to 0.80% by weight of niobium; from 0.30 to 0.80% by weight of copper; 0.025% by weight or less of nitrogen; and the balance of iron, and wherein the structure of the welding material is ferrite.

6. An arc welding process according to claim 5, wherein the carbon content of said welding material is in a range of from 0.01 to 0.03% by weight; the silicon content is in a range of from 0.50 to 1.00% by weight; and the manganese content is in a range from 0.40 to 1.00% by weight.

7. An arc welding process according to claim 5, wherein the step of preparing said welding material comprises forming the welding material into a rod.

8. An arc welding process according to claim 5, wherein the step of preparing said welding material comprises forming the welding material into a wire.

* * * * *